(12) United States Patent
Yuri

(10) Patent No.: US 10,802,241 B2
(45) Date of Patent: Oct. 13, 2020

(54) LENS APPARATUS AND IMAGE PICKUP APPARATUS

(71) Applicant: CANON KABUSHIKI KAISHA, Tokyo (JP)

(72) Inventor: Takeru Yuri, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 169 days.

(21) Appl. No.: 16/038,280

(22) Filed: Jul. 18, 2018

(65) Prior Publication Data

US 2019/0025539 A1 Jan. 24, 2019

(30) Foreign Application Priority Data

Jul. 21, 2017 (JP) ................................. 2017-141802

(51) Int. Cl.
*G02B 7/08* (2006.01)
*G02B 7/10* (2006.01)
(Continued)

(52) U.S. Cl.
CPC ............... *G02B 7/08* (2013.01); *G02B 7/021* (2013.01); *G02B 7/04* (2013.01); *G02B 7/10* (2013.01);
(Continued)

(58) Field of Classification Search
CPC . G02B 7/102; G02B 7/10; G02B 7/04; G02B 7/08; G02B 7/023; G02B 7/021; G02B 7/022; G02B 27/646; G02B 13/009; G02B 15/14; G02B 15/16; G02B 7/02; G02B 7/026; G02B 7/09; G02B 13/001; G02B 13/0065; G02B 15/00; G02B 15/163; G02B 15/173; G02B 23/2438;
(Continued)

(56) References Cited

U.S. PATENT DOCUMENTS

| 6,151,171 A | * | 11/2000 | Kenin | ............... G02B 7/102 |
| | | | | 359/676 |
| 2006/0098303 A1 | * | 5/2006 | Sato | .................. G02B 7/10 |
| | | | | 359/700 |

(Continued)

FOREIGN PATENT DOCUMENTS

JP 2017049280 A 3/2017

*Primary Examiner* — William R Alexander
*Assistant Examiner* — Sharrief I Broome
(74) *Attorney, Agent, or Firm* — Rossi, Kimms & McDowell LLP

(57) ABSTRACT

A lens apparatus includes a fixed barrel, a first optical element, a rotary barrel configured to be rotated relative to the fixed barrel about an optical axis of the first optical element and move the first optical element; a contact member including rolling members respectively arranged at positions about the optical axis. The rolling members are in contact with the rotary barrel. The contact member is restricted in rotation relative to the fixed barrel about the optical axis. A pressing member presses the contact member toward the rotary barrel. A second optical element is different from the first optical element. An operation member is configured to be rotated relative to the fixed barrel about the optical axis and move the second optical element. A space, through which the operation member passes, is formed between two of the rolling elements in a circumference of the contact member.

7 Claims, 6 Drawing Sheets

(51) Int. Cl.
*G02B 7/02* (2006.01)
*G02B 7/04* (2006.01)
*G03B 5/00* (2006.01)
*G03B 17/12* (2006.01)
*G03B 3/00* (2006.01)

(52) U.S. Cl.
CPC .............. *G03B 3/00* (2013.01); *G03B 5/00* (2013.01); *G03B 17/12* (2013.01)

(58) Field of Classification Search
CPC .. G03B 17/04; G03B 5/00; G03B 2205/0046; G03B 3/10; G03B 2205/00; G03B 2205/0053; G03B 3/02; G03B 17/12; G03B 3/00; G03B 17/00; G03B 17/02; G03B 17/14; G03B 11/043; G03B 15/05; G03B 21/142; G03B 21/145; G03B 21/53; G03B 2206/00; G03B 2215/0507; G03B 9/26; H04N 5/2254; H04N 5/23296; H04N 1/00519; H04N 2201/02418; H04N 5/225; H04N 5/2256; H04N 5/23212; H04N 5/23245; H04N 5/23287; H04N 5/23293

See application file for complete search history.

(56) References Cited

U.S. PATENT DOCUMENTS

| | | | |
|---|---|---|---|
| 2013/0016961 A1* | 1/2013 | Fukai | G03B 17/04 396/72 |
| 2015/0098012 A1* | 4/2015 | Kobayashi | G02B 7/08 348/362 |
| 2017/0059809 A1* | 3/2017 | Yokoyama | G02B 7/08 |
| 2017/0299859 A1* | 10/2017 | Sugita | G02B 7/003 |

* cited by examiner

LENS APPARATUS AND IMAGE PICKUP APPARATUS

BACKGROUND OF THE INVENTION

Field of the Invention

The present invention relates to a lens apparatus and an image pickup apparatus.

Description of the Related Art

A lens apparatus includes a plurality of lenses such as variable magnification lenses and focusing lenses which are movable in an optical axis direction. The lens apparatus includes a mechanism, which is configured to rotate a cam ring by a motor or the like to move the lenses in the optical axis direction using cams formed in the cam ring. There has been a demand for reducing play of the cam ring in the optical axis direction as much as possible to suppress influence on optical performance. In Japanese Patent Application Laid-Open No. 2017-49280, there has been proposed the following structure. In the proposed structure, end surfaces of the cam ring on both sides in the optical axis direction sandwich ball arrays with fixed surfaces opposed to the end surfaces of the cam ring in the optical axis direction, and each ball array is pressed against the cam ring by an elastic member, thereby reducing the play of the cam ring in the optical axis direction while reducing operation torque of the cam ring about an optical axis.

In the related art disclosed in Japanese Patent Application Laid-Open No. 2017-49280 mentioned above, for example, for driving of other optical elements, an operation member penetrating through the cam ring in a radial direction can be arranged at a position different from positions of the ball arrays in the optical axis direction. However, in such a configuration, the operation member penetrating through the cam ring in the radial direction and the ball arrays are arranged in series in the optical axis direction. Thus, this configuration is disadvantageous in downsizing of the lens apparatus in the optical axis direction.

SUMMARY OF THE INVENTION

The present invention provides, for example, a lens apparatus advantageous in smallness in a direction of an optical axis thereof.

According to one embodiment of the present invention, there is provided a lens apparatus, including: a fixed barrel; a first optical element; a rotary barrel configured to be rotated relative to the fixed barrel with respect to an optical axis of the first optical element and move the first optical element; a contact member including a plurality of rolling members respectively arranged at a plurality of positions about the optical axis, the plurality of rolling members being into contact with the rotary barrel, the contact member being restricted in rotation relative to the fixed barrel with respect to the optical axis; a pressing member pressing the contact member toward the rotary barrel; a second optical element being different from the first optical element; and an operation member configured to be rotated relative to the fixed barrel with respect to the optical axis and move the second optical element, wherein a space, through which the operation member passes, is formed between two of the plurality of rolling elements in a circumference of the contact member.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
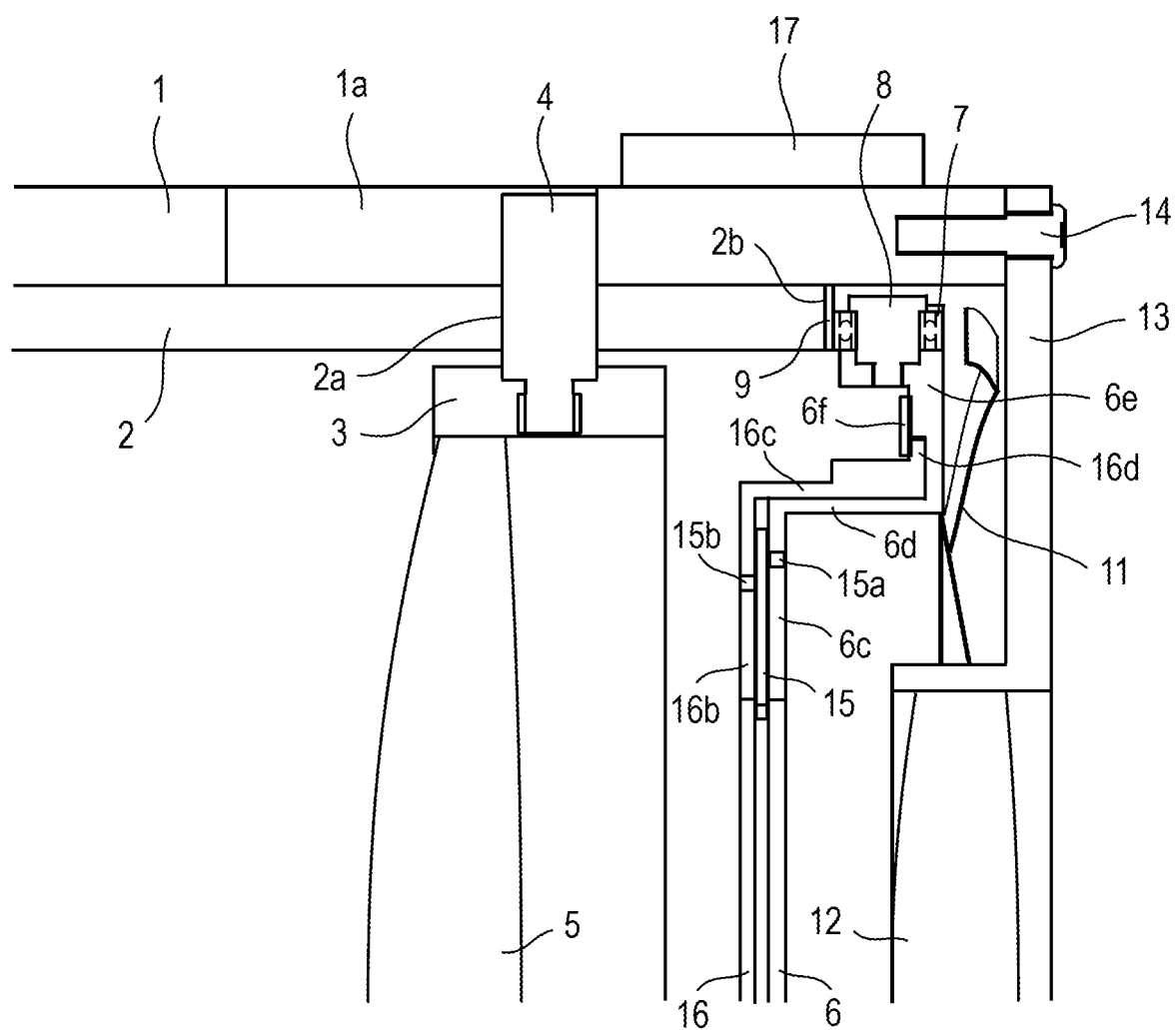
FIG. 1 is a sectional view for illustrating a lens apparatus according to an embodiment of the present invention.

In the following, an exemplary embodiment of the present invention is described in detail with reference to the accompanying drawings. FIG. 1 is a sectional view for illustrating a lens apparatus according to the embodiment of the present invention.

Embodiment

Now, with reference to FIG. 1 to FIG. 5, the lens apparatus according to the embodiment of the present invention is described.

FIG. 1 is a sectional view for illustrating the lens apparatus according to the embodiment of the present invention.

Figure 2:
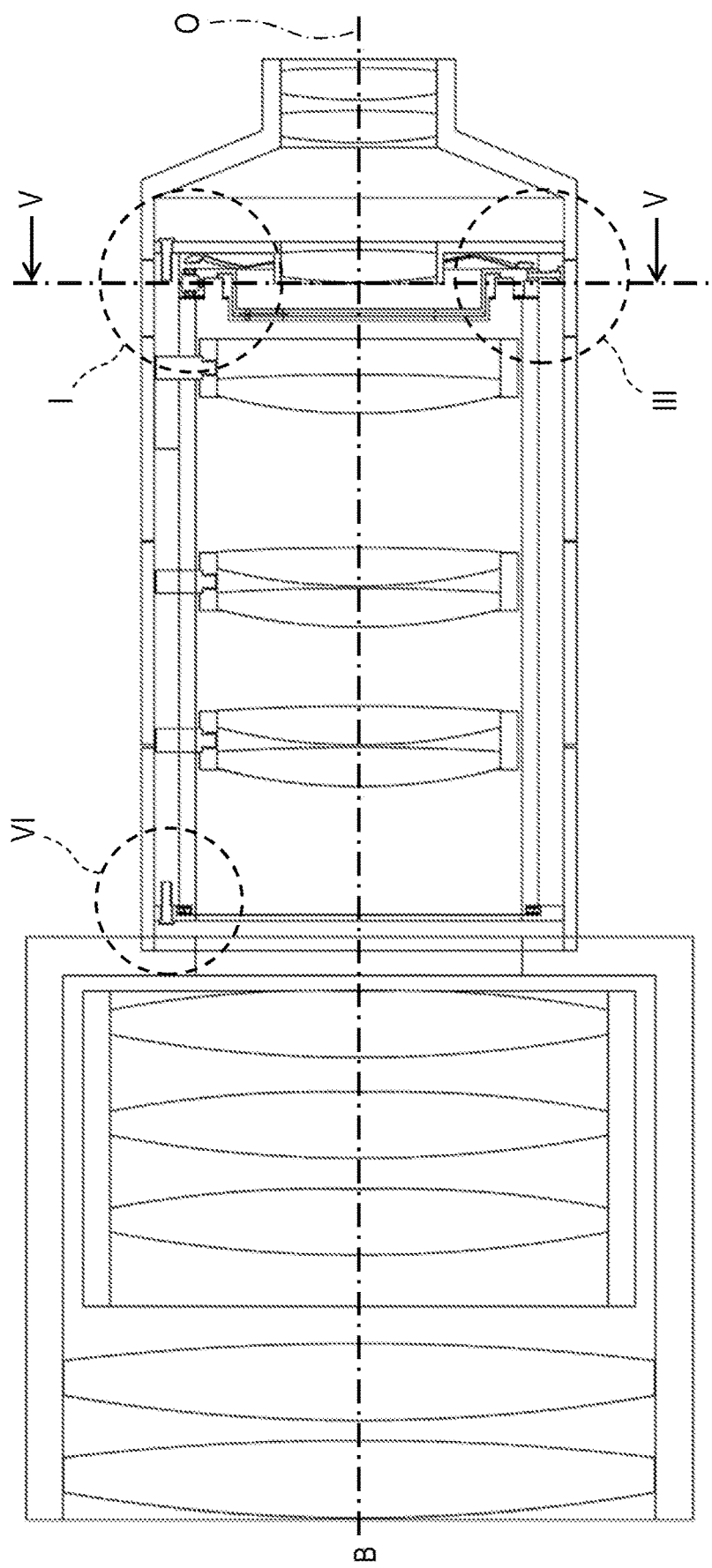
FIG. 2 is a sectional view for illustrating an entirety of the lens apparatus.

FIG. 2 is a sectional view for illustrating an entirety of the lens apparatus according to the embodiment of the present invention. In FIG. 2, the right side corresponds to an imaging plane side, and the left side corresponds to an object side.

In a fixed barrel 1, there are arranged a cam ring (rotary barrel, cam cylinder) 2, a moving lens barrel 3, a contact member 6, rolling elements (rolling members) 7, a washer 9, and a wave washer 11, which are described later. The fixed barrel 1 has at least one straight groove 1a. The straight groove 1a extends along an optical axis direction and penetrates through an outer peripheral surface and an inner peripheral surface of the fixed barrel 1. The cam ring 2 is fitted along an inner periphery of the fixed barrel 1 so as to be rotatable about an optical axis O. The cam ring 2 has an oblique groove 2a engaged with a cam pin 4 described later. The cam pin 4 having a cylindrical shape is fixed to the moving lens barrel 3 so as to extend in a direction orthogonal to the optical axis O. The cam pin 4 is engaged with the straight groove 1a and the oblique groove 2a of the cam ring 2. Further, the moving lens barrel 3 fixes a moving lens 5 with a pressing ring (not shown). With this configuration, rotation of the cam ring 2 about the optical axis O causes the moving lens (first optical element) 5 fixed to the moving lens barrel 3 to be changed in position in the optical axis direction. The cam ring 2 has, on the imaging plane side thereof, a first surface 2b which is substantially perpendicular to the optical axis O.

The contact member 6 includes a disc portion 6c, a cylindrical portion 6d having a cylindrical shape, and a rolling element support portion 6e. The disc portion 6c sandwiches stop blades 15 with a circular cam member (plane cam member) 16 described later. The cylindrical portion 6d extends from an outer peripheral portion of the disc portion 6c in a direction perpendicular to a disc surface of the disc portion 6c. The rolling element support portion 6e extends radially outward from another end side of the cylindrical portion 6d with respect to the disc portion 6c. The rolling element support portion 6e axially supports a plurality of rolling elements 7 with a plurality of cylindrical shaft screws 8, which are fixed at equal intervals in a circumferential direction so that respective axial directions are oriented in the radial direction of the disc portion 6c (in the direction orthogonal to the optical axis O). The contact member 6 is urged by the wave washer (pressing member) 11 toward the object side in the optical axis direction. The contact member presses the first surface 2b being an end surface of the cam ring 2 on the imaging plane side through intermediation of the rolling elements 7 and the washer 9. The washer 9 is bonded to the first surface 2b of the cam ring 2 substantially in parallel with the first surface 2b. When the rolling elements 7 rotate, the washer 9 prevents the first surface 2b of the cam ring 2 from being damaged or deformed.

A fixed lens barrel 13, which holds a lens 12 fixed thereto by a pressing ring (not shown), is fixed to the fixed barrel 1 with a screw 14. The wave washer 11 is provided between the fixed lens barrel 13 and the contact member 6, and urges the contact member 6 toward the cam ring 2.

The contact member 6 is inserted into the circular cam member 16 so that the circular cam member 16 is slidable relative to the outer peripheral surface of the cylindrical portion 6d of the contact member 6. The circular cam member 16 includes a disc portion 16b and a cylindrical portion 16c having a cylindrical shape. The disc portion 16b sandwiches the stop blades 15 with the disc portion 6c of the contact member 6. The cylindrical portion 16c extends from an outer peripheral portion of the disc portion 16b in a direction perpendicular to a disc surface of the disc portion 16b. The outer peripheral surface of the cylindrical portion 6d of the contact member 6 and an inner peripheral surface of the cylindrical portion 16c are held in contact with each other so as to be slidable relative to each other. The circular cam member 16 has a flange portion 16d projecting radially outward on a side of an end portion of the disc portion 6c at a position most apart from the disc portion 16b (rolling element support portion 6e side). A position of the circular cam member 16 in the optical axis direction is regulated with respect to the contact member 6 by a pressing plate 6f, which is formed so as to cover the flange portion 16d and fixed to the contact member 6. With the flange portion 16d sandwiched between the contact member 6 and the circular cam member 16 so as to be slidable, a position of the circular cam member 16 in the optical axis direction with respect to the contact member 6 is substantially fixed, but the circular cam member 16 is turnable about the optical axis.

Rotary shafts 15a of the plurality of stop blades 15 for setting an opening diameter of a lens unit (not shown) are engaged with the contact member 6 in the optical axis direction, and cam followers 15b of the stop blades 15 on a side opposite to the rotary shafts 15a are engaged with cam grooves formed in the disc portion 16b of the circular cam member 16. The contact member 6, the stop blades 15, the rotary shafts 15a, the cam followers 15b, and the circular cam member 16 having the cam grooves form a stop mechanism (aperture stop member, second optical element).

Figure 3:
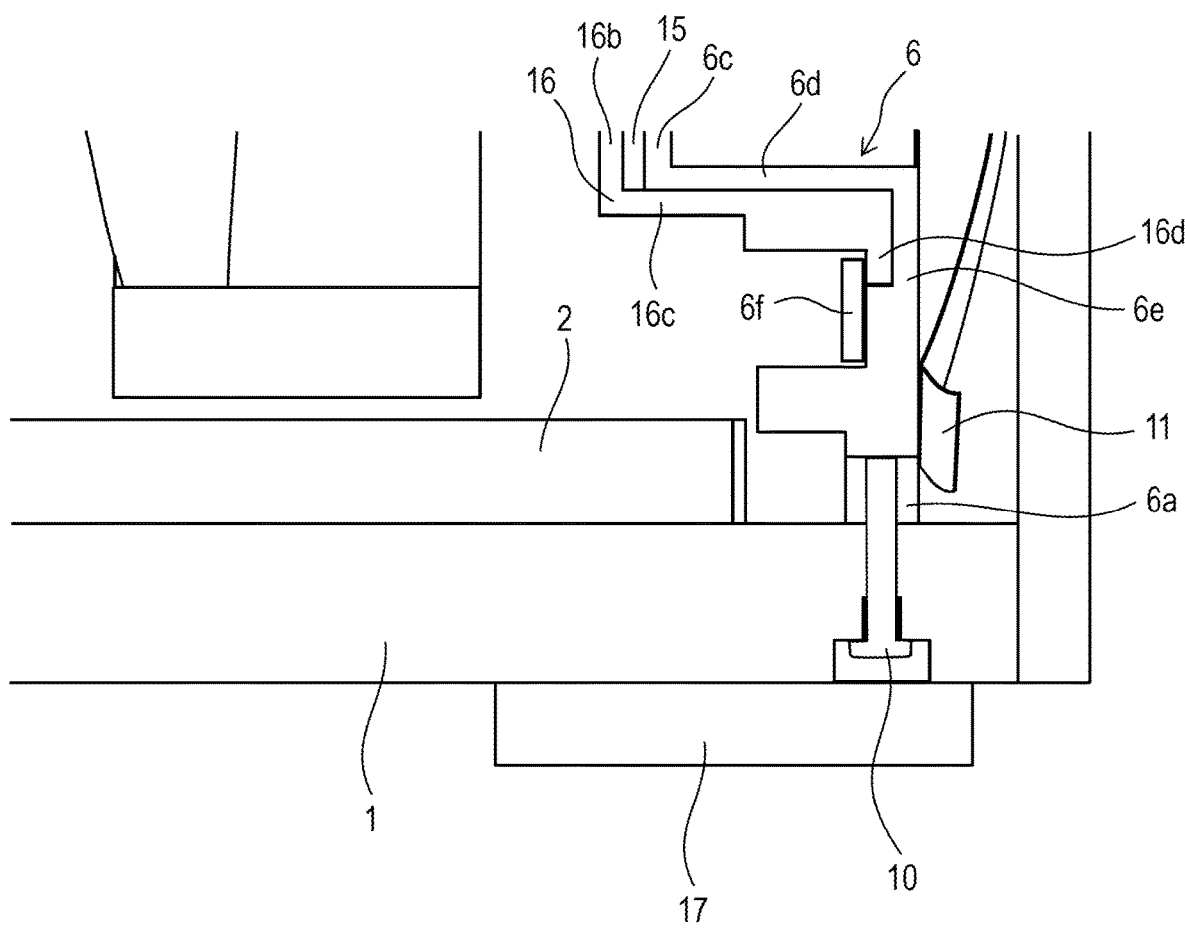
FIG. 3 is a schematic view for illustrating a relationship between a contact member and a rotation regulation pin in the embodiment of the present invention.

FIG. 3 is an illustration of a relationship of the fixed barrel 1, the contact member 6, and a rotation regulation pin 10 in the lens apparatus according to the present invention. The contact member 6 has a pin insertion portion 6a in an outer peripheral portion thereof. The rotation regulation pin 10 having a cylindrical shape, which is oriented in a direction orthogonal to the optical axis O with respect to the fixed barrel 1, is inserted into the pin insertion portion 6a, thereby regulating (preventing) rotation of the contact member 6 about the optical axis O.

Figure 4:
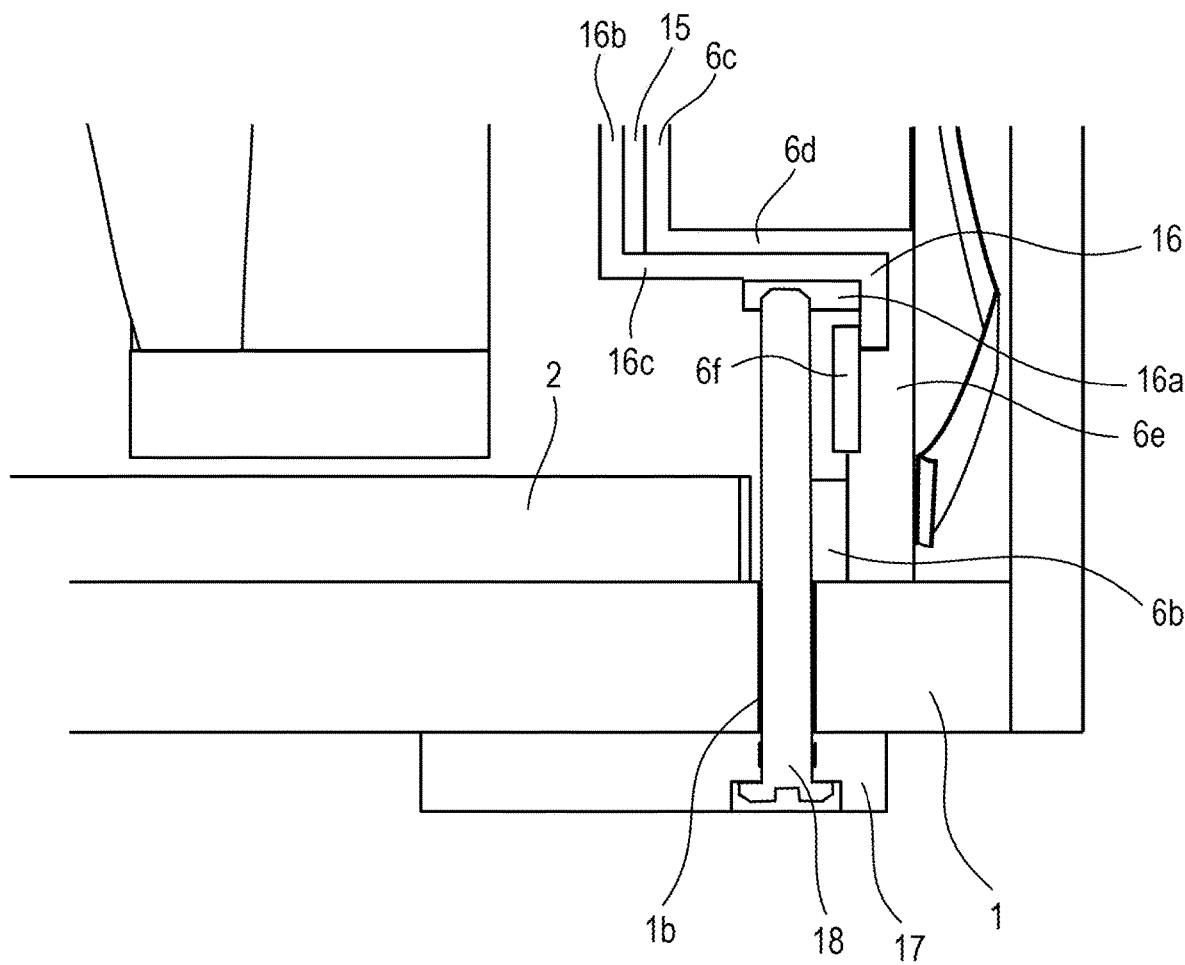
FIG. 4 is a schematic view for illustrating a relationship between a circular cam member and a stop coupling pin in the embodiment of the present invention.

FIG. 4 is an illustration of a relationship of the circular cam member 16, a stop operation ring 17, and a stop coupling pin (operation member) 18 in the lens apparatus according to the embodiment of the present invention. The circular cam member 16 is rotatably engaged with an outer peripheral surface of the cylindrical portion 6d of the contact member 6. A cutout 16a being a pin insertion portion, which is engaged with the stop coupling pin 18 having a cylindrical shape and being oriented in a direction orthogonal to the optical axis O, is formed in the outer peripheral portion of the circular cam member 16. The cutout 16a is arranged between positions of the plurality of rolling elements 7 about the optical axis O so that at least a part of the cutout 16a in the optical axis direction overlaps a position of the rolling elements 7 in the optical axis direction. The stop coupling pin 18 for operating the circular cam member 16 can be operated from a radially outer side about the optical axis through the cutout 16a. The stop coupling pin 18 is fixed to the stop operation ring 17 which is rotatable about the optical axis O on an outer periphery of the fixed barrel 1. When the stop operation ring 17 is rotated, the turning operation is transmitted to the circular cam member 16 through the stop coupling pin 18 and further transmitted to the cam followers 15b through the cam grooves, thereby driving the stop blades 15 to rotate and setting an opening diameter. The fixed barrel 1 and the contact member 6 have a cutout 1b and a cutout 6b, respectively, which define a space extending along a movable range of the stop coupling pin 18 so as to avoid interference with the stop coupling pin 18.

Figure 5:
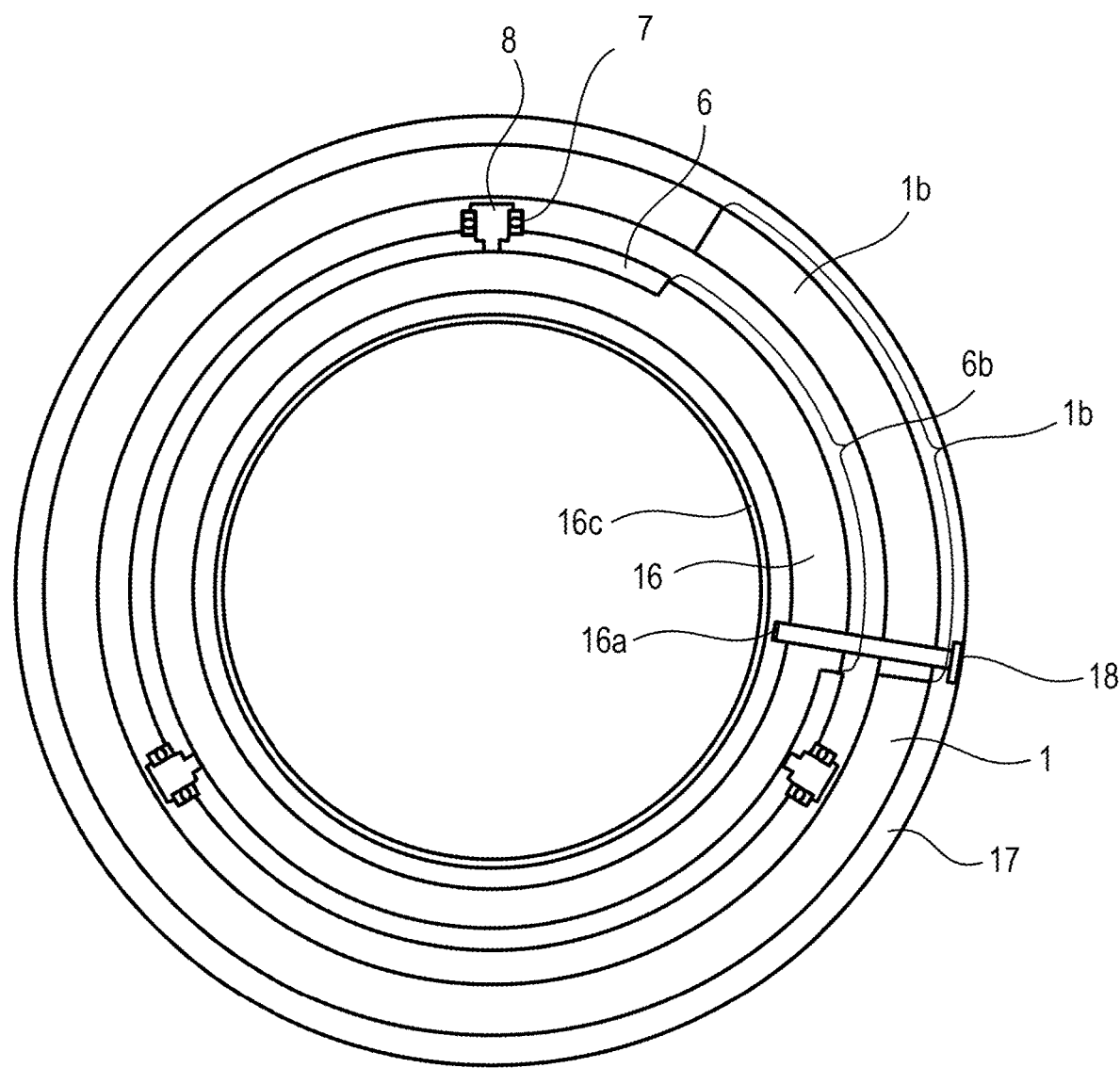
FIG. 5 is a sectional view for illustrating a relationship between rolling elements and the stop coupling pin in the embodiment of the present invention.

FIG. 5 is a sectional view, which is taken along a plane perpendicular to the optical axis and seen from the image plane side A, for illustrating a relationship of the contact member 6, the rolling elements 7, the shaft screws 8, the circular cam member 16, the stop operation ring 17, and the stop coupling pin 18 in the lens apparatus according to the embodiment of the present invention.

Figure 6:
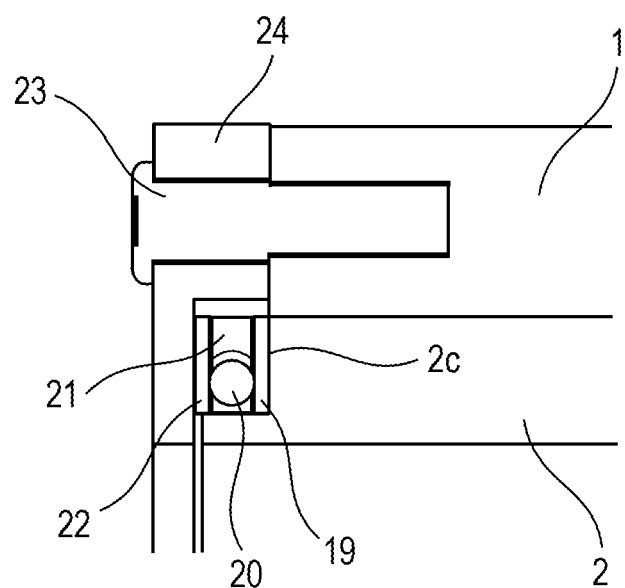
FIG. 6 is a schematic view for illustrating a fixing structure for the cam ring in the embodiment of the present invention.

FIG. 6 is an enlarged view for illustrating the region VI of FIG. 2, and is an illustration of a fixing structure for a second surface 2c, which is substantially perpendicular to the optical axis O, on the object side B of the cam ring 2 in the lens apparatus according to the embodiment of the present invention. On the second surface 2c of the cam ring 2, there is arranged a washer 19 so as to be engaged with a radially outer portion of the cam ring 2 and be substantially parallel to the second surface 2c. A ball array (thrust ball bearing) 20 including a plurality of balls having a substantially equal diameter is arranged about the optical axis O on the washer 19, and is held in contact with the washer 19 in the optical axis direction. A radially inner side of the ball array 20 is held in contact with the radially outer portion of the cam ring 2, and a retainer 21 having a plurality of U-shaped holes in a radially inner portion thereof is arranged on a radially outer side of the ball array 20. The balls of the ball array 20 are arranged in the U-shaped holes, respectively. With the retainer 21, positions of the balls of the ball array 20 about the optical axis are maintained at substantially equiangular intervals. On a side of the ball array 20 opposite to the contact surface with respect to the washer 19, a washer 22 having substantially the same shape as the washer 19 is arranged so that a surface thereof in contact with the ball array 20 is substantially parallel to the washer 19. A fixing member 24 fixed to the fixed barrel 1 by a screw 23 from the object side in the optical axis direction is arranged on a surface of the washer 22 on a side opposite to the ball array 20, and is held in contact with the substantially parallel surface of the washer 22, thereby achieving a structure for preventing play of the cam ring 2 in the optical axis direction.

As described above, in the lens apparatus according to the embodiment of the present invention, the cam ring 2 is always urged by the wave washer 11 toward the object side in the optical axis direction, thereby regulating play in the optical axis direction. In the urging direction, the resistance of the cam ring 2 during rotation is alleviated by the rolling elements 7 and the ball array 20, thereby being capable of preventing increase in operation torque. In an angular region of the contact member 6 about the optical axis on which the rolling elements 7 are not arranged, the stop coupling pin 18 and the rolling elements 7 can be arranged at positions overlapping in the optical axis direction, thereby being capable of reducing an overall length in the optical axis direction. Further, a component to be arranged in the angular region about the optical axis on which the rolling elements 7 are not arranged is not limited to the stop coupling pin 18, and any component which can be arranged in this region may contribute to reduction in overall length.

As a modification example, the urging member for urging the cam ring 2 is not limited to the wave washer, and the same effect can be achieved also with another elastic member such as a coil spring or a rubber.

In this embodiment, description is made with assumption that three rolling elements 7 are provided, but the number of the rolling elements 7 is not limited to three. However, as the number of the rolling elements increases, slide friction increases, and the angular region about the optical axis on which the rolling elements are not arranged becomes smaller. Therefore, it is preferred that the number of the rolling elements 7 be small.

In this embodiment, the cam ring 2 is fitted along the inner periphery side of the fixed barrel 1. However, the same effect can be achieved even with a configuration in which the cam ring is fitted along the outer periphery side of the fixed barrel.

With regard to the ball array 20, the same effect can be achieved even with components such as a large-diameter bearing or the rolling elements such as the rolling elements 7 described above.

In the above-mentioned embodiment, description is made of the case in which the amount of opening of the stop device arranged on the inner side of the lens barrel is operated through the cutout 6b of the contact member 6. However, according to the present invention, the use of the cutout is not limited to the operation of the stop device. The present invention is applicable also to other optical elements arranged on the same optical path as those of optical elements driven by the cam ring. For example, a mechanism for allowing adjustment of a position in the optical axis direction of the stop device arranged on one side in the optical direction of a component configured to be movable in the optical axis direction by the cam ring may be set operable through the cutout. Alternatively, a lens which is arranged adjacent to the cam ring and movable in the optical axis direction may be set operable through the cutout.

The lens apparatus according to the present invention and a camera, which includes an image pickup element configured to receive an optical image formed by the lens apparatus, can construct an image pickup apparatus achieving the effect of the present invention.

The exemplary embodiment of the present invention is described above, but the present invention is not limited to this embodiment and can be modified and changed variously within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-141802, filed Jul. 21, 2017, which is hereby incorporated by reference herein in its entirety.

What is claimed is:

1. A lens apparatus comprising: a fixed barrel; a first optical element; a rotary barrel configured to be rotated relative to the fixed barrel with respect to an optical axis of the first optical element and move the first optical element; a contact member including a plurality of rolling members respectively arranged at a plurality of positions in a circumferential direction about the optical axis, the plurality of rolling members being in contact with the rotary barrel, the contact member being restricted in rotation relative to the fixed barrel with respect to the optical axis; a pressing member pressing the contact member toward the rotary barrel; a second optical element that is different from the first optical element; and an operation member configured to be rotated relative to the fixed barrel with respect to the optical axis and move the second optical element, wherein the operation member passes through a space formed between two of the plurality of rolling members.

2. The lens apparatus according to claim 1, wherein each of the plurality of rolling members is supported to be rotatable with respect to an axis orthogonal to the optical axis.

3. The lens apparatus according to claim 1, wherein a number of the plurality of rolling members is more than two.

4. The lens apparatus according to claim 1, wherein the rotary barrel is configured to move the first optical element in a direction of the optical axis.

5. The lens apparatus according to claim 1, wherein:
the second optical element includes a stop, and
the operation member includes a pin for moving the stop.

6. The lens apparatus according to claim 5, further comprising:
a cam member rotatable with respect to the optical axis together with the pin,
wherein the stop includes a stop blade including a cam follower engaged with the cam member.

7. An image pickup apparatus comprising:
a lens apparatus including:
a fixed barrel;
a first optical element;
a rotary barrel configured to be rotated relative to the fixed barrel with respect to an optical axis of the first optical element and move the first optical element;
a contact member including a plurality of rolling members respectively arranged at a plurality of positions in a circumferential direction about the optical axis, the plurality of rolling members being in contact with the rotary barrel, the contact member being restricted in rotation relative to the fixed barrel with respect to the optical axis;

a pressing member pressing the contact member toward the rotary barrel;

a second optical element that is different from the first optical element; and an operation member configured to be rotated relative to the fixed barrel with respect to the optical axis and move the second optical element, wherein the operation member passes through a space formed between two of the plurality of rolling members; and an image pickup element configured to pick up an image formed by the lens apparatus.

* * * * *